United States Patent
Sakaguchi et al.

[11] Patent Number: 5,904,226
[45] Date of Patent: May 18, 1999

[54] APPARATUS FOR SUPPLYING OIL IN ENGINE

[75] Inventors: Yuichi Sakaguchi, Nagoya; Hiroyuki Kawase, Okazaki; Koichi Shimizu, Toyota; Yuuji Yoshihara, Toyota; Hiromasa Suzuki, Toyota, all of Japan

[73] Assignee: Toyota Jidosha Kabushiki Kaisha, Toyota, Japan

[21] Appl. No.: 08/936,025

[22] Filed: Sep. 23, 1997

[30] Foreign Application Priority Data

Sep. 24, 1996 [JP] Japan .................................... 8-251758

[51] Int. Cl.$^6$ ................................ F01L 1/34; F01M 1/06
[52] U.S. Cl. ...................... 184/67; 123/90.15; 123/90.16; 123/90.33
[58] Field of Search ............................ 74/568 R; 184/67, 184/7.4; 123/90.15, 90.16, 90.17, 90.33, 90.34

[56] References Cited

U.S. PATENT DOCUMENTS

| | | | |
|---|---|---|---|
| 4,502,426 | 3/1985 | Skelley | 123/90.15 |
| 5,309,878 | 5/1994 | Kandler et al. | 123/90.34 X |
| 5,769,044 | 6/1998 | Moriya | 123/90.17 |

FOREIGN PATENT DOCUMENTS

| | | |
|---|---|---|
| 3-13403 | 2/1991 | Japan . |
| 5-43847 | 7/1993 | Japan . |
| 7-7524 | 2/1995 | Japan . |
| 8-14015 | 1/1996 | Japan . |

*Primary Examiner*—John A. Jeffery
*Assistant Examiner*—Colby M. Hansen
*Attorney, Agent, or Firm*—Kenyon & Kenyon

[57] ABSTRACT

An engine has a crankshaft, a combustion chamber and a valve that selectively opens and closes the combustion chamber. The valve has a timing relationship to the crankshaft and lift characteristic. A control device hydraulically alters at least one of the timing relationship and the lift characteristic. A lubricant passage is connected with the control device to supply oil to a mechanism that is formed by engine parts slidably contacting one another within the engine. An auxiliary passage is provided for supplying the oil to the mechanism. Oil supplied from an oil pump to said auxiliary passage is restricted by an electromagnetic valve that is actuated based on the instruction from an electric controller when engine speed is lower than a predetermined value.

15 Claims, 8 Drawing Sheets

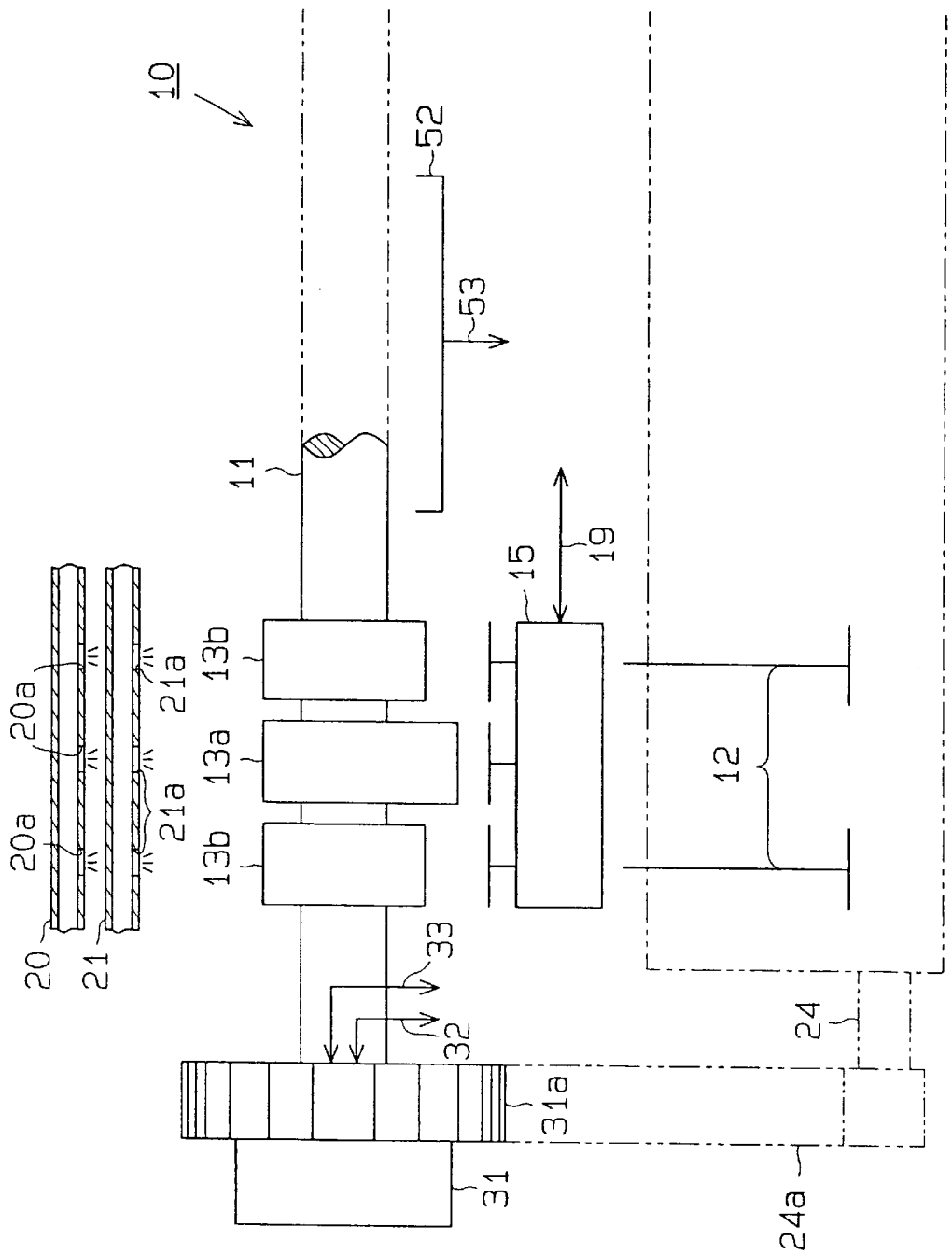

APPARATUS FOR SUPPLYING OIL IN ENGINE

BACKGROUND OF THE INVENTION

1. Field of the Invention

The present invention relates to an apparatus for supplying oil in engines. More particularly, the present invention pertains to an improved apparatus for supplying oil to a hydraulic variable valve performance mechanism and a structure for supplying lubricant oil.

2. Description of the Related Art

Many existing engines are equipped with a mechanism for varying characteristics, such as valve timing and lift, of a set of intake valves or a set of exhaust valves in accordance with the engine running conditions. This enhances the power and performance of the engine and reduces undesirable emissions. Japanese Examined Patent Publication No. 3-13403 discloses a variable valve performance mechanism that hydraulically changes valve lift and an apparatus for lubricating the moving parts in the variable valve performance mechanism.

As shown in FIGS. 6(a) and 6(b), a mechanism 71 for varying valve performance includes a rocker shaft 73, in which an oil pressure passage 72 is defined. A low speed rocker arm 74 and a high speed rocker arm 75 are pivotally mounted on the rocker shaft 73 in association with a valve. The rocker arms 74, 75 are pivoted about the axis of the rocker shaft 73 by a low speed cam and a high speed cam (neither of which is shown), respectively. Pivoting of the low speed rocker arm 74 about the axis of the rocker shaft 73 opens and closes the valve. "Right" and "left" as used below refer to the right and left directions of FIGS. 6(a) and 6(b).

A hole 76 extends in the low speed and high speed rocker arms 74, 75 parallel to the rocker shaft 73. A segmented coupling pin 77 is slidably fitted in the hole 76. An oil chamber 78 is defined between the right end of the pin 77 and the right end of the hole 76. The chamber 78 communicates with the oil pressure passage 72. A coil spring 79 extends between the left end of the coupling pin 77 and the left end of the hole 76.

When moved to a position close to the left end of the hole 76 against the force of the coil spring 79 as shown in FIG. 6(b), the coupling pin 77 couples the low speed rocker arm 74 with the high speed rocker arm 75. This causes the low speed rocker arm 74 to pivot integrally with the high speed rocker arm 75. As a result, the valve is opened and closed by the high speed cam by way of the low speed and high speed rocker arms 74, 75. This increases the valve lift. When the coupling pin 77 is moved to the right end of the hole 76 by the force of the coil spring 79, as shown in FIG. 6(a), the low speed rocker arm 74 is uncoupled from the high speed rocker arm 75. This causes the valve to be opened and closed by the low speed cam by way of the low speed rocker arm 74. This decreases the valve lift.

The valve lift is generally changed based on the engine speed. For example, when the engine is running at a lower speed, the valves are opened and closed by the low speed cam as illustrated in FIG. 6(a) to decrease the amount of air drawn into the engine. When the engine is running at a higher speed, the valves are opened and closed by the high speed cam to increase the amount of air drawn into the engine.

An oil passage 85 is connected to the oil pressure passage 72 for supplying oil to the passage 72. The supplied oil is used to lubricate the low speed and high speed cams. The sliding surfaces between the cams and the rocker arms 74, 75 also need lubrication. The passages 72, 85 are connected to an oil pump 83 via a switching valve 87. The switching valve 87 includes a variable orifice 86 and is connected to an oil pump 83. The oil pump 83 is driven by a crankshaft of the engine (not shown). The pump 83 draws oil from an oil pan 84 and discharges the oil to the switching valve 87.

When the engine is running at a high speed, the switching valve 87 sends oil from the oil pump 83 to the oil pressure passage 72 as illustrated in FIG. 6(b). The oil is then flows to the passage 85. In this state, the restriction amount of the orifice 86 is controlled to deliver enough oil to the chamber 78 to displace the pin 77 against the force of the spring 79 as shown in FIG. 6(b). Thus, the oil pressure actuates the mechanism 71 and switches the cams for increasing the valve lift. Part of the oil passing through the oil passage 85 is injected from holes 88 for lubricating the sliding parts of the cams and the rocker arms 74, 75.

When the engine is running at a low speed, the switching valve 87 sends oil from the oil pump 83 to the oil passage 85 as illustrated in FIG. 6(a). The oil then flows to the passage 72. In this state, the restriction amount of the orifice 86 is controlled so that the oil pressure in the chamber 78 is too low to displace the pin 77 against the force of the spring 79. As a result, the mechanism 71 switches the cams to decrease the valve lift. Part of the oil passing through the oil passage 85 is supplied to the cams for lubricating the sliding parts of the cams and the rocker arms 74, 75.

However, when the engine is running at a low speed, the power of the oil pump 83, which is driven by rotation of the crankshaft, is also lowered. This results in less oil being discharged from the pump 83. At low speeds, oil is supplied to the oil pressure passage 72 via the oil passage 85. In other words, after part of the oil in the passage 85 is diverted to the sliding parts, the remaining oil flows to the oil pressure passage 72. Accordingly, the oil pressure in the passage 72 is lowered. Thus, when the engine is running at a low speed, it takes a significant amount of time to generate enough oil pressure in the oil passage 72 to actuate the mechanism 71 in the oil passage 72. Under these conditions the mechanism 71 has a relatively slow response.

When the engine is running at a high speed, oil is supplied to the oil passage 85 via the oil pressure passage 72. The pressure of the oil in the passage 72 falls when the mechanism 71 is actuated. Accordingly, the oil pressure in the oil passage 85 is lowered. This reduces the amount of oil supplied to the sliding parts. Thus, the lubrication of the sliding parts may be insufficient.

SUMMARY OF THE INVENTION

Accordingly, it is an objective of the present invention to provide an oil supplying apparatus in engines that always supplies a sufficient amount of oil to the variable valve performance mechanism and sliding parts of the engine at any given running state of the engine.

To achieve the foregoing and other objectives and in accordance with the purpose of the present invention, a apparatus for supplying lubricant oil to an engine is provided. The engine has a crankshaft, a combustion chamber, a valve that selectively opens and closes the combustion chamber. The said valve has a timing relationship to the crankshaft and lift characteristic, control means for hydraulically altering at least one of the timing relationship and the lift characteristic and a lubricant passage connected with the control means to supply oil to a mechanism within the engine. The apparatus includes an oil pump, an auxiliary lubricant passage for supplying the oil to the mechanism, means for restricting the oil supplied from the oil pump to the auxiliary lubricant passage, actuating means for actuating the restricting means when engine speed is lower than a predetermined value.

BRIEF DESCRIPTION OF THE DRAWINGS

The invention, together with objects and advantages thereof, may best be understood by reference to the following description of the presently preferred embodiments together with the accompanying drawings in which:

FIG. 3 is a diagram illustrating a variable valve performance mechanism and a lubricating mechanism according to a second embodiment;

FIG. 6(a) is a diagram illustrating a prior art oil supply circuit; and.

DETAILED DESCRIPTION OF THE PREFERRED EMBODIMENTS

A first embodiment of the present invention will now be described with reference to FIGS. 1 and 2.

Figure 1:
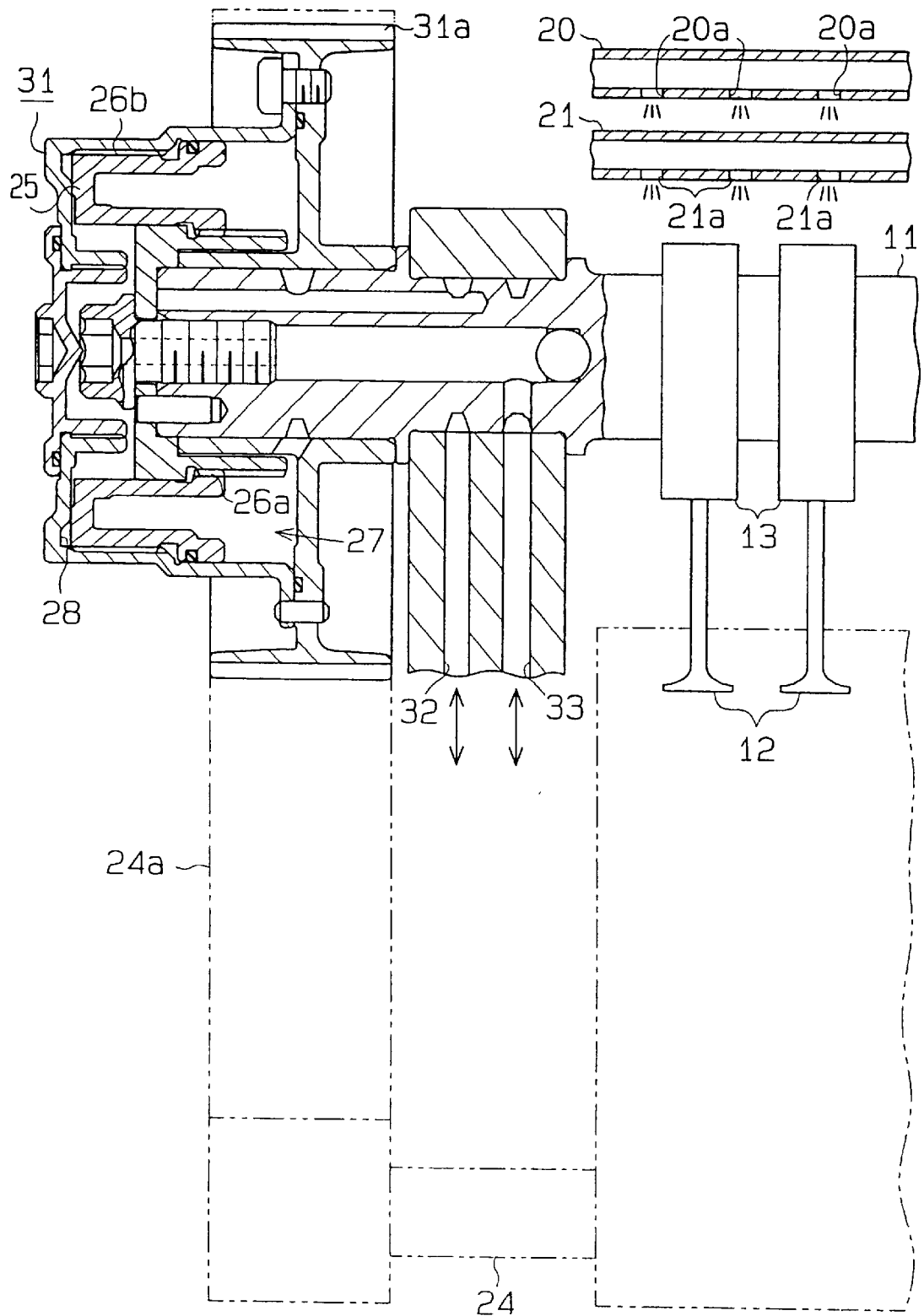
FIG. 1 is a diagrammatic cross-sectional view illustrating a variable valve performance mechanism and a lubricating mechanism according to a first embodiment.

As shown in FIG. 1, a camshaft 11 is rotatably supported on a cylinder head (not shown) of an engine. The camshaft 11 is provided with cams 13. Each cam 13 corresponds a valve 12 of one of intake ports and exhaust ports. The cams 13 rotate with the camshaft 11 thereby selectively opening and closing the valves 12. Sliding parts of the valves 12 and the cams 13 are lubricated with oil supplied from a first oil passage 20 or a second oil passage 21.

A variable valve timing mechanism 31 is provided at one end of the camshaft 11. The mechanism 31 advances or retards the rotational phase of the camshaft 11 relative to the crankshaft 24.

The mechanism 31 includes a pulley 31a, which is coupled to the crankshaft 24 by a timing belt 24a. The pulley 31a is coupled to the camshaft 11 by a ring gear 25, which functions as a hydraulic piston. The ring gear 25 has helical splines 26a, 26b on its inner surface and its outer periphery. The camshaft 11 is coupled with the pulley 31a by the engagement of the helical splines 26a, 26b with outer teeth formed on the camshaft 11 and inner teeth formed on the pulley 31a. A phase advancing oil pressure chamber 27 and a phase retarding oil pressure chamber 28 are located to the sides of the ring gear 25. Oil is supplied to and drained from the oil pressure chambers 27, 28 by a phase advancing oil conduit 32 and a phase retarding oil conduit 33. This moves the ring gear 25 along the axis of the camshaft 11. Movement of the ring gear 25 changes the rotational phase of the pulley 31a relative to the camshaft 11. As a result, the rotational phase of the camshaft 11 relative to the crankshaft 24 is selectively advanced or retarded.

Figure 2:
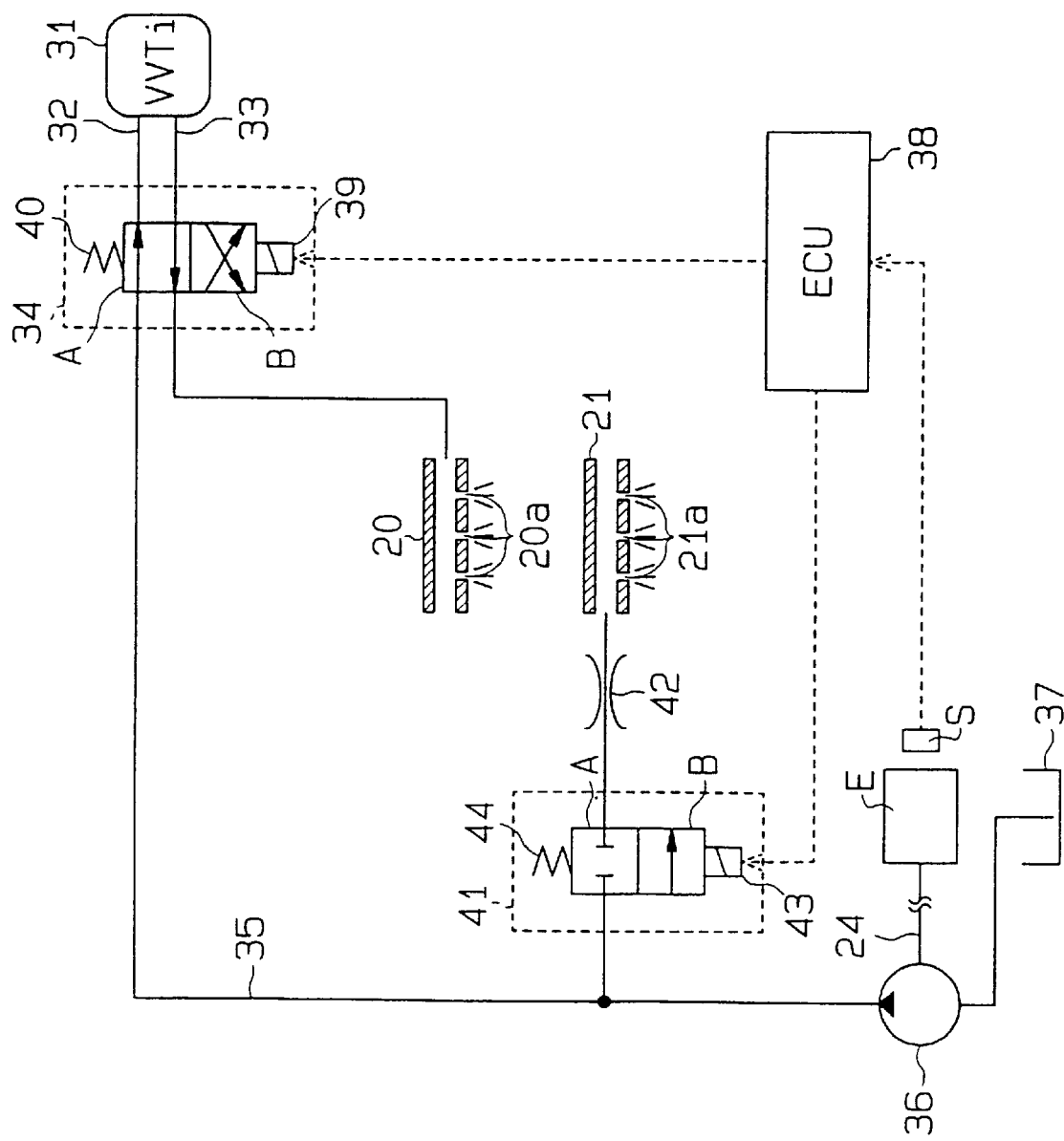
FIG. 2 is a diagram illustrating an oil circuit for supplying oil to the mechanism of FIG. 1.

FIG. 2 illustrates a hydraulic circuit that supplies oil to and drains oil from the variable valve timing mechanism 31 (VVTi) and also lubricates sliding surfaces of the valves 12 and the cams 13.

The VVTi 31 is connected to an oil control valve (OCV) 34 by oil conduits 32, 33. An oil pressure passage 35 and a first oil passage 20 are connected to the OCV 34. The oil pressure passage 35 is communicated with an oil pan 37 provided in the lower portion of the engine via an oil pump 36. The pump 36 is coupled to and rotated by the crankshaft 24.

The OCV 34 is controlled by an electronic control unit (ECU) 38. The ECU 38 receives signals from various sensors (not shown) that detect the running state of the engine such as the engine speed. The OCV 34 is a two position type electromagnetic valve having four ports, an electromagnetic solenoid 39 and a coil spring 40. The OCV 34 further has two port combinations, A and B. When the solenoid 39 is not energized, the OCV 34 employs the A combination, which is held in alignment with the conduits 32, 33, by the force of the coil spring 40. When the solenoid 39 is energized, the OCV 34 is moved so that the B combination is aligned with the conduits 32, 33.

When the A combination is selected, the oil pressure passage 35 is communicated with the phase advancing oil conduit 32, and the first oil passage 20 is communicated with the phase retarding oil conduit 33. In this state, the pump 36 supplies oil in the oil pan 37 to the VVTi 31 via the oil pressure passage 35, the OCV 34 and the phase advancing oil conduit 32. The oil in the VVTi 31 is supplied to the sliding parts via the phase retarding conduit 33, the OCV 34 and the first oil passage 20. The oil is then returned to the oil pan 37. The VVTi 31, to which oil is supplied from the phase advancing oil conduit 32, advances the rotational phase of the camshaft 11 relative to the rotational phase of the crankshaft 24. This advances the actuation of the valves 12.

When the B combination is selected based on signals from the ECU 38, the oil pressure passage 35 is communicated with the phase retarding oil conduit 33 and the first oil passage 20 is communicated with the phase advancing oil conduit 32. In this state, the pump 36 supplies oil from the oil pan 37 to the VVTi 31 via the oil pressure passage 35, the OCV 34 and the phase retarding oil conduit 33. The oil in the VVTi 31 is supplied to the sliding parts via the phase advancing conduit 32, the OCV 34 and the first oil passage 20. The VVTi 31, to which oil is supplied from the phase retarding oil conduit 33, rotates the rotational phase of the camshaft 11 relative to the rotational phase of the crankshaft 24. This retards the actuation of the valves 12.

The second oil passage 21 is connected to the oil pressure passage 35 with an oil switching valve (OSV) 41 in between. The passage 21 is connected to the passage 35 upstream of the OCV 34. An orifice 42 is located between the OSV 41 and the second oil passage 21 for controlling the oil pressure in the passage 21. The OSV 41 is also controlled by the ECU 38.

The OSV 41 is a two position type electromagnetic valve having two ports, an electromagnetic solenoid 43 and a coil spring 44. The OSV 41 has two combinations A and B. When the solenoid 43 is not energized, the A combination is employed and is held in an operative position by the force of the coil spring 44, and the B combination is inoperative. In this state, the second oil passage 21 is disconnected from the oil pressure passage 35. When the solenoid 43 is energized, the B combination is held in an operative position, and the A combination is inoperative. In this state, the second oil passage 21 is communicated with the oil pressure passage 35.

When controlling the OSV 41, the ECU 38 computes the speed of the engine E based on a signal from an engine speed sensor S. When the engine E is running at a low speed, the ECU 38 causes the OSV 41 to select the A combination to prevent oil from flowing to the second oil passage 21. In this state, all the oil discharged by the pump 36 is supplied to the oil pressure passage 35. That is, even if the engine is running at a low speed and the pump 36 is discharging a relatively small amount of oil, the VVTi 31 is provided with a sufficient amount of oil. Therefore, the oil pressure of the oil delivered to the VVTi 31 is relatively high.

When the engine speed increases gradually and reaches a high speed range, which is equal to or higher than 5000 rpm, the ECU 38 controls the OSV 41 to switch to the B combination. This causes oil to be supplied to the second oil passage 21. In the same manner as the oil supplied to the oil passage 20, the oil in the second oil passage 21 is supplied to the sliding parts from the holes 21a and returned to the oil pan 37. Therefore, the amount of oil delivered to the sliding parts is higher when the engine E is running at a higher speed. The operation of the engine E is stabilized accordingly. While the engine is running at high speed, the pump 36 is discharging a greater amount of oil. Thus, the operation of the VVTi 31 is not disturbed by the diversion of oil to the oil passage 21.

Figure 2A:
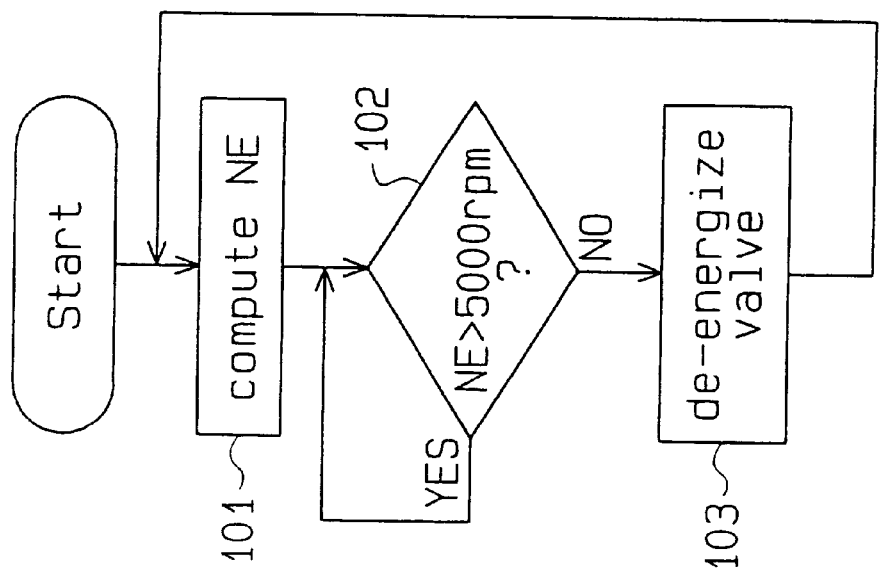
FIG. 2(a) is a flowchart illustrating the operation of the ECU 38.

FIG. 2(a) is a flowchart illustrating the operation of the ECU 38.

The ECU 38 computes the engine speed NE based on signals from the engine speed sensor S at step 101. At step 102, the ECU 38 judges whether the engine speed NE is greater than a predetermined value, for example, 5000 rpm. If the determination is negative, the ECU 38 moves to step 103. At step 103, the ECU 38 stops sending signals to the OSV 41 to de-energize the solenoid 43 thereby causing the A combination of the OSV 41 to operate. As a result, the oil is not supplied to the second oil passage 21 and the VVTi 31 receives sufficient oil via the OCV 34 to provide ample oil pressure for actuating the VVTi 31.

When the engine is running at a low speed, oil is supplied to the sliding parts by the first oil passage 20, and the pressure in the passage 35 is maintained at a sufficient level for actuating the VVTi 31. In other words, even if the engine is running at a low speed, actuation of the VVTi 31 is reliable and responsive.

When the engine is running at a low speed, the second oil passage 21 is disconnected from the oil pressure passage 35. This allows all the oil discharged from the pump 36 to flow into the passage 35, which guarantees reliable and responsive actuation of the VVTi 31.

Further, when the engine E is running at a high speed, oil is supplied to the valves 12 and the cams 13 by both oil passages 20, 21. This delivers sufficient lubrication to the parts 12, 13. Therefore, when the engine E is running at a high speed, insufficient lubrication of the sliding parts will not occur. At this time, the pump 36 is discharging a relatively great amount of oil. Thus, the operation of the VVTi 31 is not disturbed by the diversion of some oil to the passage 21.

Figure 4:
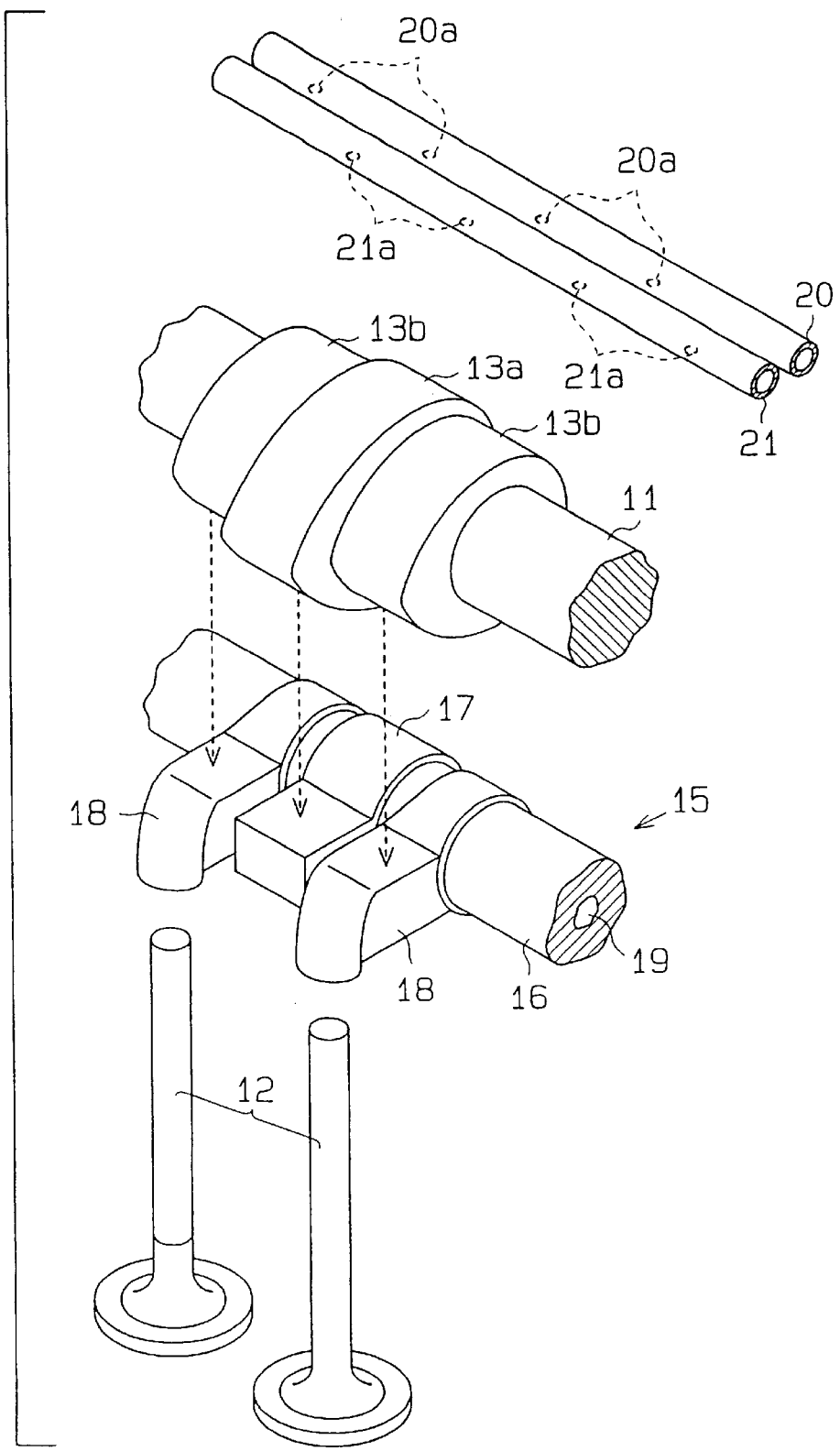
FIG. 4 is an exploded perspective view illustrating a variable valve lift mechanism according to the second embodiment.

A second embodiment of the present invention will now be described with reference to FIGS. 3 to 5. In this embodiment, oil is supplied to a variable valve lift mechanism, a VVTi and sliding surfaces of valves and cams. The variable valve lift mechanism per se is well known in the art.

A camshaft 11 is rotatably supported on the cylinder head of an engine as shown in FIG. 3. The camshaft 11 is provided with a high speed cam 13a and pair of low speed cams 13b sandwiching the high speed cam 13a. The profiles of the low speed cams 13b differ from that of the high speed cam 13a. The valve lift of the valves 12 when actuated by the high speed cam 13a is greater than the valve lift of the valves 12 when actuated by the low speed cams 13b. When the engine is running at a low speed, the valves 12 are actuated by the low speed cams 13b for introducing a relatively small amount of air into the engine. When the engine is running at a high speed, the valves 12 are actuated by the high speed cam 13a for introducing a relatively great amount of air into the engine. Like the apparatus according to the first embodiment, oil is supplied to the sliding parts of the valves 12 (including a variable valve lift mechanism 15, which will be described below) and the cams 13a, 13b by the first oil passage 20 or the second oil passage 21.

The variable valve lift mechanism 15 is located between the cams 13a, 13b and the valves 12. As shown in FIG. 4, the mechanism 15 includes a rocker shaft 16 extending parallel to the camshaft 11. The rocker shaft 16 has a high speed rocker arm 17, which corresponds to the high speed cam 13a, and low speed rocker arms 18, which correspond to the low speed cams 13b. As shown in FIG. 4, the high speed rocker arm 17 is located between and corresponds to the pair of the low speed rocker arms 18.

The high speed and low speed rocker arms 17, 18 pivot about the axis of the rocker shaft 16. The lower distal end of each low speed rocker arm 18 is aligned with one of the valves 12. An oil passage 19 is defined in the rocker shaft 16 and is communicated with the low speed rocker arms 18.

Figure 6A:
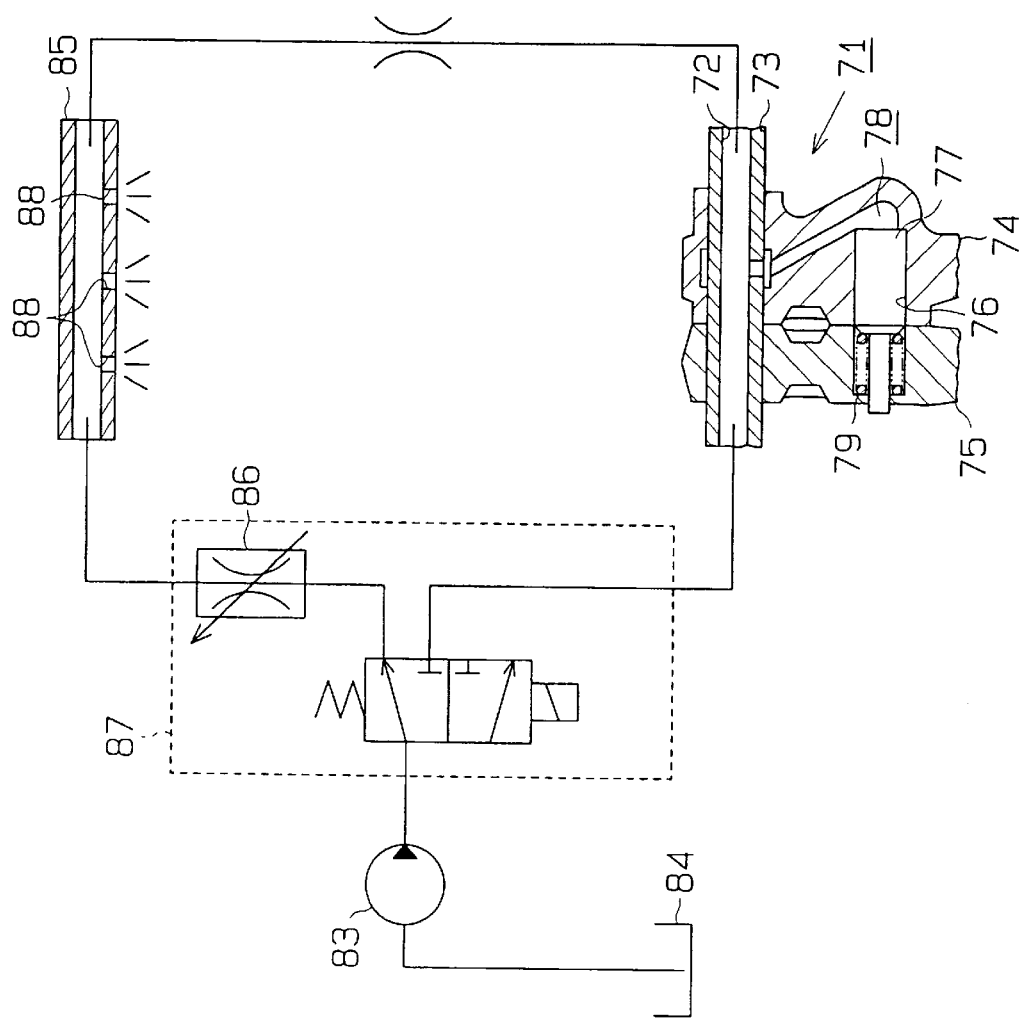
Figure 6B:
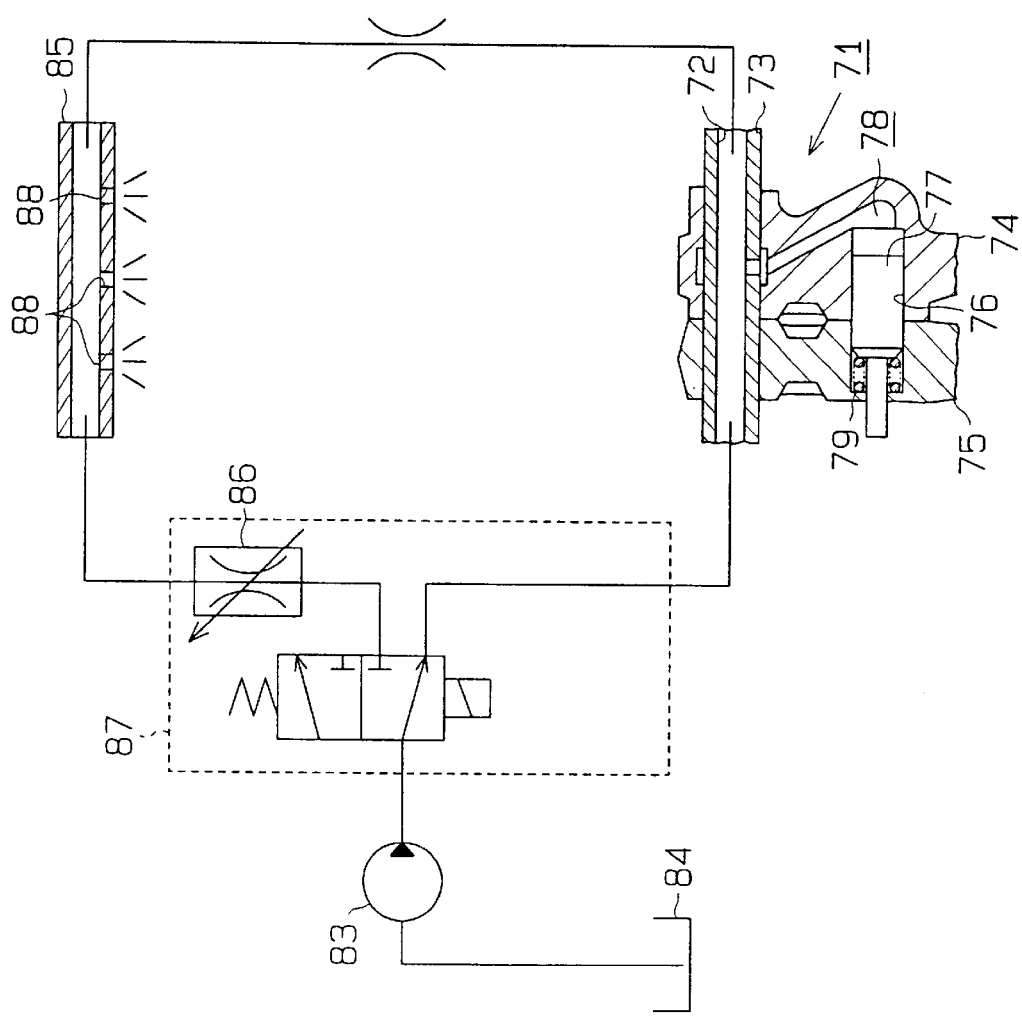
FIG. 6(b) is a diagram illustrating a prior art oil supply circuit.

When oil is supplied to the oil passage 19 to increase the pressure in the passage 19, a coupling pin in each associated set of rocker arms 17, 18 (see FIGS. 6(a) and 6(b)) is moved to a position to connect the low speed rocker arms 18 to the corresponding high speed rocker arm 17. In this state, the associated valves 12 are opened and closed by the high speed cam 13a by way of the high speed rocker arm 17 and the low speed rocker arms 18.

When the pressure in the passage 19 is decreased, the coupling pin is moved to a position to disconnect the low speed rocker arms 18 from the corresponding high speed rocker arm 17. In this state, the valves 12 are opened and closed by the low speed cams 13b by way of the low speed rocker arms 18.

As shown in FIG. 3, a VVTi 31 is provided on one end of the camshaft 11 for advancing or retarding the rotational phase of the camshaft 11 relative to the rotational phase of the crankshaft 24. FIG. 5 illustrates a hydraulic circuit of an apparatus for supplying oil to the sliding parts in the variable valve lift mechanism 15 and the VVTi 31.

Figure 5:
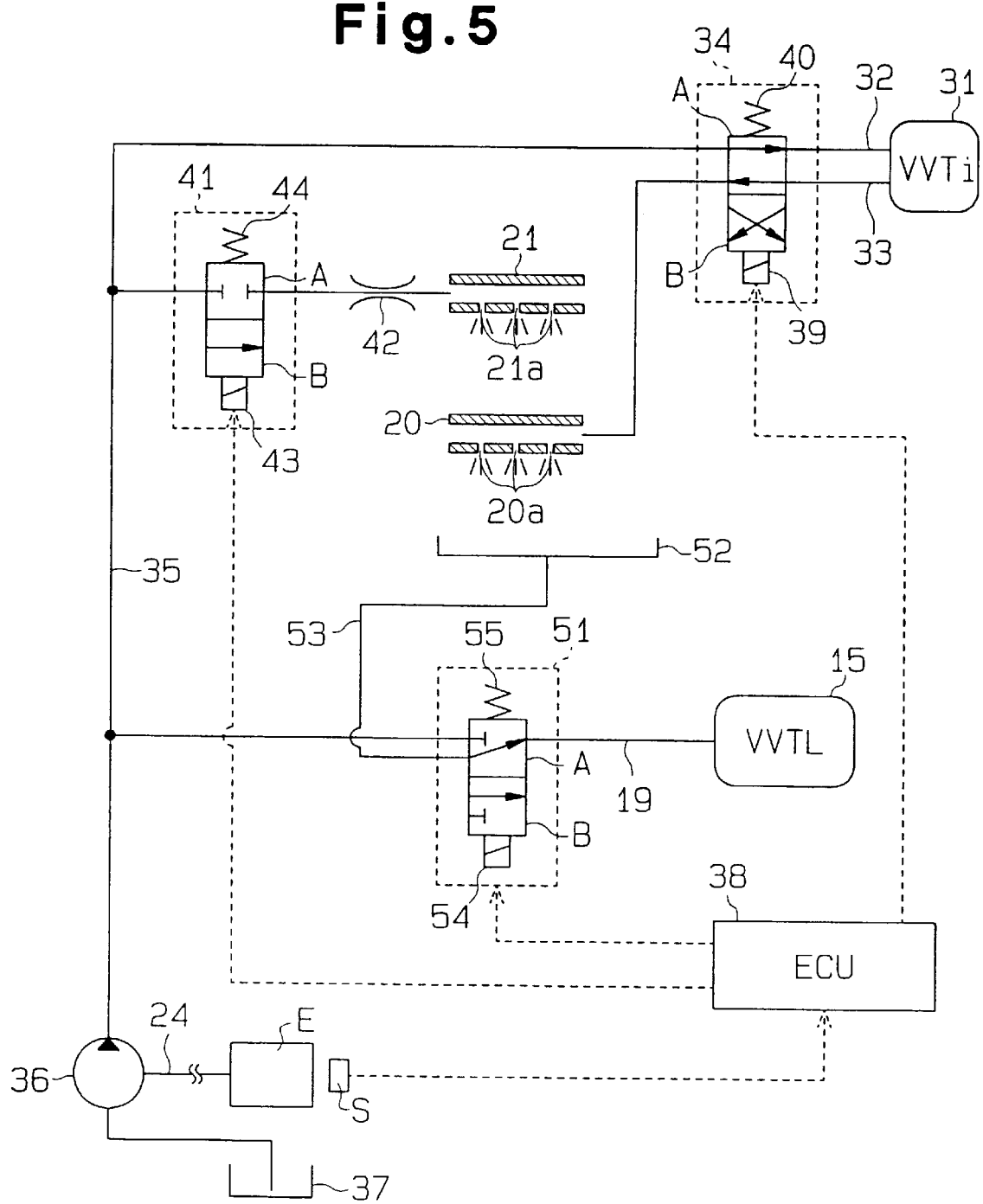
FIG. 5 is a diagram illustrating an oil circuit for supplying oil to the mechanism of FIG. 4.

As shown in FIG. 5, the oil passage 19 of the variable valve lift mechanism (VVTL) 15 is connected to the oil pressure passage 35 via an oil switching valve (OSV) 51, which is controlled by the ECU 38. The OSV 51 is connected to an oil receiver 52 provided in the cylinder head of the engine by an oil line 53. The oil receiver 52 receives oil supplied to the sliding parts from the first and second oil passages 20, 21.

The OSV 51 is a two position type electromagnetic valve having three ports, an electromagnetic solenoid 54 and a coil spring 55. The OSV 51 further includes two combinations, A and B, of the ports. When the solenoid 54 is not energized, the A combination is selected and held in position by the force of the coil spring 55. The A combination connects the oil line 53 with the oil passage 19 as shown in FIG. 5. When the solenoid 54 is energized, the B combination is selected. The B combination shuts off the oil line 53 and communicates the oil pressure passage 35 with the oil passage 19.

The OSV 51 is controlled to select the B combination for communicating the oil pressure passage 35 with the oil passage 19 thereby changing the cams actuating the valves 12 from the low speed cams 13b to the high speed cams 13a. In this state, oil is supplied to the oil passage 19 from the oil pressure passage 35 via the OSV 51. This increases the oil pressure in the passage 19. The increased oil pressure in the passage 19 actuates the variable valve lift mechanism 15 to change from the low speed cams 13b to the high speed cam 13a.

On the other hand, when changing from the high speed cam 13a to the low speed cams 13b, the OSV 51 is controlled to select the A combination for communicating the oil line 53 with the oil passage 19. This decreases the oil pressure in the passage 19 thereby actuating the variable valve lift mechanism 15 such that the low speed cams 13b actuate the valves 12. Further, when the oil line 53 is communicated with the passage 19, the passage 19 is filled with oil flowing from the oil receiver 52 via the line 53. This prevents air from entering the passage 19 when the variable valve lift mechanism 15 is not operating. Therefore, failure of the mechanism 15 caused by air in the passage 19 is avoided. The operation of the mechanism 15 is thus reliable and responsive. Descriptions of the OCV 34 and the OSV 41 are not repeated for the second embodiment since the operation of the OCV 34, which controls the VVTi 31, and the operation of the OSV 41, which controls the supply of oil to the second oil passage 21, are the same in both the first and the second embodiments.

The oil receiver 52 is located at a position higher than the variable valve lift mechanism 15. Therefore, locating the OSV 51 lower than the mechanism 15 does not cause air to enter the passage 19. This increases the number of places where the OSV 51 can be located, thus adding to the flexibility of the design.

It should be apparent to those skilled in the art that the present invention may be embodied in many other specific forms without departing from the spirit or scope of the invention. Particularly, it should be understood that the invention may take in the following forms.

(1) In the embodiments of FIGS. 1 to 5, the second oil passage 21 is shut off when the engine is running at a low speed. However, instead of shutting the second passage 21 off, the amount of oil supplied to the passage 21 may be decreased so that sufficient pressure in the passage 35 for actuating the VVTi 31 is maintained. In this case, the OSV 41 is replaced with a flow control valve.

(2) The VVTi 31 is not limited to the ring gear type, which is described above. That is, the oil supplying mechanism of the embodiments of FIGS. 1 to 5 may be adopted in a known vane type VVTi.

(3) In the first embodiments of FIGS. 1 to 5, sliding surfaces of the valves 12 and cams 13 (13a, 13b) are lubricated by oil from the first and second oil passages 20, 21. However, chains and gears of the engine may be also lubricated by the oil from the passages 20, 21.

(4) In the embodiments of FIGS. 1 to 5, the OSV 51 may be a relief valve.

(5) In the embodiments of FIGS. 1 to 5, the oil pump 36 is actuated by the crankshaft 25. However, the pump 36 may be electrically actuated. In this case, the driving force of the pump 36 is controlled based on the running state of the engine.

Therefore, the present examples and embodiments are to be considered as illustrative and not restrictive and the invention is not to be limited to the details given herein, but may be modified within the scope and equivalence of the appended claims.

What is claimed is:

1. An apparatus for supplying lubricant oil to an engine, said engine having a crankshaft, a combustion chamber, a valve that selectively opens and closes the combustion chamber, wherein said valve has a timing relationship to the crankshaft and lift characteristic, control means for hydraulically altering at least one of the timing relationship and the lift characteristic, and a lubricant passage connected with the control means to supply oil to a mechanism within the engine, said apparatus comprising:

an oil pump;

an auxiliary lubricant passage for supplying the oil to the mechanism;

means for restricting the oil supplied from the oil pump to the auxiliary lubricant passage;

actuating means for actuating the restricting means when engine speed is lower than a predetermined value.

2. The apparatus as set forth in claim 1, wherein said mechanism includes engine parts that slidably contact one another.

3. The apparatus as set forth in claim 2, further comprising:

detecting means for detecting the engine speed; and determining means for determining whether the engine speed is lower than the predetermined value.

4. The apparatus as set forth in claim 3, wherein said control means includes a variable valve timing device that alters the valve timing according to the engine speed.

5. The apparatus as set forth in claim 4, wherein said restricting means includes an electromagnetic valve for selectively connecting and disconnecting the oil pump with the auxiliary lubricant passage, and wherein said actuating means and determining means include an electric control unit that actuates the electromagnetic valve when the detected engine speed is lower than the predetermined value.

6. The apparatus as set forth in claim 5, wherein said lubricant passage and auxiliary lubricant passage both supply the oil to the mechanism when the engine speed is greater than the predetermined value.

7. The apparatus as set forth in claim 6, wherein said lubricant passage and auxiliary lubricant passage both include holes for injecting the oil to the mechanism to lubricate the mechanism.

8. The apparatus as set forth in claim 7, further comprising:

said control means further including a variable valve lift device for altering the valve lift in accordance with the engine speed;

an oil pan for receiving the oil that was injected from the lubricant oil passage to the mechanism; and second restricting means for connecting the variable valve lift mechanism with the oil pan when the engine speed is lower than the predetermined value, said second restricting means being operable to connect the valve lift device to the pump when the engine speed is greater than the predetermined value.

9. The apparatus as set forth in claim 8, wherein said second restricting means includes a second electromagnetic valve that is controlled by the electric control unit.

10. An apparatus for supplying lubricant oil to an engine, said engine having a valve that allows airflow from or to the engine, first control means for hydraulically controlling the valve to alter a valve timing, second control means for hydraulically controlling a valve lift and a lubricant passage connected with the first control means to supply oil to a mechanism that is formed by engine parts slidably contacting one another within the engine, said apparatus comprising:

an oil pump;

an auxiliary lubricant passage for supplying the oil to the engine mechanism;

first restricting means for restricting the oil supplied from the oil pump to the auxiliary lubricant passage;

actuating means for actuating the restricting means when engine speed is smaller than a predetermined value;

an oil pan for receiving the oil that was injected from the lubricant oil passage to the mechanism; and second restricting means for connecting the variable valve lift mechanism with the oil pan when the engine speed is lower than the predetermined value, said second restricting means being operable to connect the valve lift device to the pump when the engine speed is greater than the predetermined value.

11. The apparatus as set forth in claim 10, wherein said lubricant passage is located above the second means.

12. The apparatus as set forth in claim 11, further comprising:

detecting means for detecting the engine speed; and determining means for determining whether the engine speed is lower than the predetermined value.

13. The apparatus as set forth in claim 12, wherein said restricting means includes an electromagnetic valve for selectively connecting and disconnecting the oil pump with the auxiliary lubricant passage, and wherein said actuating means and determining means include an electric control unit that actuates the electromagnetic valve when the detected engine speed is lower than the predetermined value.

14. The apparatus as set forth in claim 13, wherein said lubricant passage and auxiliary lubricant passage both supply the oil to the mechanism when the engine speed is greater than the predetermined value.

15. The apparatus as set forth in claim 14, wherein said lubricant passage and auxiliary lubricant passage both include holes for injecting the oil to the mechanism to lubricate the mechanism.

* * * * *